United States Patent Office 2,773,763
Patented Dec. 11, 1956

2,773,763

MINERAL FIBER PRODUCT CONTAINING HYDRATED VIRGIN KRAFT PULP AND METHOD OF PRODUCING THE SAME

Wylmer L. Scott, Lancaster Township, Lancaster County, Pa., assignor to Armstrong Cork Company, Lancaster, Pa., a corporation of Pennsylvania No Drawing. Application April 22, 1954,
Serial No. 425,046

18 Claims. (Cl. 92—3)

This invention relates to a mineral fiber product and method of producing the same. It is concerned more particularly with the production of a mineral fiber board of the insulating type such as an acoustical or sound-insulating board or a heat-insulating board. The product will have many other uses, however.

Insulation products are now frequently produced in board form from vegetable fibers, principally wood fibers and bagasse fibers. The so-called mineral or glass wools have also been used, including wool products made from furnace slags, from limestone, and from glass. The current trend, particularly in the large municipalities, is to require that the various materials going into building structures in potentially dangerous fire areas be essentially fireproof. This has eliminated the use of all of the vegetable fiber insulating materials and has limited the use of mineral or glass wool boards to those which are essentially completely fireproof. In order to achieve the requisite fireproofness, it has been necessary to sacrifice other desirable physical characteristics of the products, such as insulation value, lightness of weight, ease of fabrication, and low cost.

An object of the present invention therefore is to provide a fire-resistant mineral fiber product possessing good heat or sound insulation value or both, reasonably low density or weight, and other desirable physical characteristics mentioned above.

One of the major problems in producing a mineral fiber insulation board is to provide adequate strength in the finished product to permit fabrication and handling without excessive breakage. The conventional fireproof binders such as hydraulic cement and gypsum, while they provide adequate fire resistance, produce a product which has less than the desired insulating value. In addition, such products are difficult to fabricate as, for instance, in the manufacture of a perforated acoustical unit where many hundred drilled openings are provided in each square foot of the material, and where frequently the edges of the units are beveled and sometimes slotted to receive mechanical fastening members. Such products are also quite heavy; and, since transportation costs have become a substantial factor in the marketing of products of this sort, the use of these conventional fireproof inorganic binders is not economically feasible.

It has been proposed also to employ news pulp, used kraft paper, and other similar fibrous materials either alone or in combination with resins and other materials as bonding agents in the preparation of fire-retardant insulation products. All of these binding materials when used in adequate quantities to provide the requisite strength produce products which are deficient in fire resistance.

Another object of the invention therefore is to provide a fire-resistant mineral fiber product by employing a special organic and combustible binder which possesses unusual physical properties, imparting a high structural strength to the finished article without sacrificing to any material extent its fireproofness.

I have found that kraft pulp, if it is so prepared and treated that it has a low lignin content (a permanganate number below 24 and preferably below 16) and is hydrated to a substantial degree (below 10 cc. Canadian freeness—3 gram), provides an excellent binder and also aids in the dispersion of the mineral fibers.

By combining a binder including such especially prepared virgin kraft pulp with artificially formed mineral fibers, such as glass wool fibers, mineral wool fibers, or mixtures of these fibers, a structurally strong and fire-resistant product can be produced which may be readily fabricated on conventional fiber board equipment.

It has also been found that improved results are achieved in the fire resistance of mineral fiber products which are bonded with combustible organic binders if bentonite is incorporated into the mix, for it imparts a glazed, rigid surface to the product upon exposure to a flame and heating to a temperature above the softening point of the mineral fiber, particularly glass fiber.

An additional object of the invention therefore is to improve the fire-resistant characteristics of mineral fiber products which are bonded with combustible organic binders by incorporating bentonite into the mix.

Other objects of the invention will become clear from consideration of the following detailed explanation of the invention.

The kraft pulp which I employ may be formed from northern hard woods or southern soft woods, such as pine, and may be prepared by the usual sulphate cooking process, using either a so-called "soft cook" or a "severe cook." The pulp may be bleached or unbleached, depending upon the service for which the final product is intended. Where a finished product which is essentially white is desired and one which will not be coated with paint, it is of course preferred to use bleached fibers. Conventional kraft pulp as customarily prepared for the production of kraft wrapping paper will not produce the desired result, however, for reasons which will be clear from the following discussion.

As mentioned above, it has been determined that the lignin content of the kraft pulp, measured by its permanganate number, has a very substantial effect upon the strength of the finished mineral fiber product. With a kraft pulp having a permanganate number of 29.6, for example (conventional kraft pulp for wrapping paper manufacture), a test sheet including 72% glass wool fibers, 16% kraft pulp, and 12% filler had a modulus of rupture of 202 pounds per square inch, while an identically formed test sheet of the same composition but with the kraft pulp having a permanganate number of 5.3 had a modulus of rupture of 472 pounds per square inch. This means that for products requiring high structural strength, less of the low permanganate number kraft pulp is required to obtain the desired strength, and since this material is combustible, the quantity to be used may be kept to a low value where an incombustible product is to be produced. Preferred practice is to employ a kraft pulp having a permanganate number of 16 or less, although for some services a permanganate number as high as 24 may be tolerated. Optimum results appear to be achieved when the permanganate number is in the order of 5.

The permanganate number of the kraft pulp may be determined in accordance with the procedure set out by the United States Department of Agriculture, Forest Service, Forest Products Laboratory, Bulletin No. R19, entitled "Methods for the Chemical Analysis of Pulps and Pulpwoods," revised September 1939.

The bonding value of used kraft paper is even less than that of the raw kraft pulp used in its preparation, due, it is believed, to the sizing and drying of the fibers in the preparation of the paper. In any event, such fibers cannot be successfully used in place of the virgin kraft pulp, even though the original kraft stock may have had a low permanganate number. To distinguish from such materials which have heretofore been used in the preparation of mineral fiber products, reference is made to the present pulp as "virgin" kraft pulp.

Also, as mentioned previously, it has been found that the degree of hydration of the virgin kraft pulp, measured by its Canadian 3-gram freeness, materially affects the value of this material as a binder component in a mineral fiber product. Tests have shown that as the Canadian freeness of the kraft pulp is lowered, the modulus of rupture and the tensile strength of the mineral fiber product increase. After the Canadian 3-gram freeness has been reduced to a value in the order of 10, the structural strength of the finished product increases disproportionately to decrease in freeness and exceptionally strong mineral fiber products are obtained where the Canadian 3-gram freeness is 5 or less. Preferred practice is to reduce the freeness to essentially zero, and there is no disadvantage in reducing the freeness even below such factor, although there is no known standard procedure for determining freeness of less than zero.

The kraft pulp having the desired low permanganate number may be hydrated to the desired degree by use of conventional equipment such as a Jordan engine. The machine should be so adjusted and operated that the kraft pulp produced will be adequately hydrated, and this may be determined by the standard Canadian freeness testing method, using a 3-gram specimen. This test is extensively used in the paper industry and is described in TAPPI Standard Specification T 227–m50, as corrected October 1950. Where the kraft pulp is to be supplied to the mineral fiber product fabricator by a producer of such kraft materials, the maximum average permanganate number of the pulp should be specified and the pulp may be supplied as wet laps, as air-dry sheets, or in other forms. The wet laps or air-dry sheets will preferably be dispersed in hot water, about 100° F., and a consistency of about 5% obtained. This slurry may be fed directly to the Jordan engine for hydration. After hydration to a Canadian 3-gram freeness of 10 or less, the kraft pulp is ready for use. It may be defined as virgin kraft pulp having a maximum average permanganate number of 24 and hydrated to a maximum average Canadian 3-gram freeness of 10.

The kraft pulp may be the sole binding component for the mineral fiber board. Where cost is a factor of importance, other materials may be substituted in part for the kraft pulp. Flour may be successfully used as a binder ingredient with the kraft pulp, such as an unbleached wheat flour known as "Pillsbury Amazon Second Clear" which has a crude protein content of not less than 14%, crude fat not less than 2.5%, crude fiber not more than 1.5%, and a nitrogen-free exteract of not less than 67%. Tapioca starch, potato starch, and the like may also be used as partial binders. Resinous type binding agents such as phenol-formaldehyde resin dispersions may be substituted in part for the kraft pulp, either alone or with one or more of the other binders mentioned.

Where the finished product is to have an "ironed-on" finish coating, it is preferred to use some flour or other starch with the kraft pulp, for the ironing characteristics are improved by the presence of the starch. For other services, other modifying agents may be incorporated, as is well known in the art.

For best results at least about 6 parts of the kraft pulp should be present for each 100 parts of total solid components of the product and generally not more than 16 parts of the kraft pulp will be needed to produce a product of the desired strength with the requisite fireproofness. Additional quantities of the kraft pulp and the other organic binders may be used but at some sacrifice in fireproofness. The quantity of added binder ingredients will depend upon the amount of the special virgin kraft stock incorporated, the average permanganate number of the stock and the degree of hydration, as well as the desired physical properties to be attained in the finished product. Actually, the added binder ingredients may exceed the kraft pulp in weight, generally with a sacrifice in strength or other physical characteristics but frequently with some reduction in cost. Good results are achieved with about equal parts of the kraft pulp and the added binder ingredient, such as flour. This will be illustrated in the specific examples which appear later in this application. The total organic binder including the kraft pulp will generally be in the order of 10% to 16% of the total dry weight of the product.

With respect to the use of bentonite, it is preferred to incorporate this material into the product, especially where the product may be required to meet certain standards of fireproofness, such as Federal Specification SS–A–118a. As noted above, it is believed that the bentonite fuses with or at least mechanically reinforces the mineral fibers upon the application of a flame and heating of the surface to a point above the softening point of the mineral fiber. This is especially noticeable when glass fibers are employed, and it serves to render the area exposed to a flame, rigid and firm, preventing collapse of material which might expose other parts of the building to the fire. Where bentonite is used and the product is made with conventional fiber board forming equipment such as a Fourdrinier machine, it is believed that some of the bentonite migrates to the surface of the finished product during board formation; and, with the exposed face of the board rich in bentonite, a hard, glazed surface appears upon exposure of the product to direct application of a flame. The quantity of bentonite incorporated will vary, depending upon the service to which the final product will be put and also upon the process employed in fabrication of the product. Where a Fourdrinier machine is employed, operating upon a relatively dilute slurry of the board-forming components, about 13 pounds of bentonite in a total batch having a dry weight of 100 pounds is about the maximum that can be employed and still obtain rapid board formation. This is due to the fact the bentonite swells extensively upon imbibition of moisture, and this reduces the drainage rate, making water removal more difficult at high formation speeds. As mentioned above, the use of bentonite is not essential to the production of the product of the invention but is an important factor in obtaining a fireproof product which will meet the applicable Federal Specifications for an incombustible, perforated sound-insulation material.

It is also preferred to incorporate into the product filler materials such as finely divided diatomaceous earth. In place of diatomaceous earth, aluminum silicate pigment, finely ground limestone, precipitated calcium carbonate, gypsum, and other similar filler materials or combinations of them may be used. The diatomaceous earth imparts to the surface of the finished product a texture which is smooth and soft as contrasted with the usual harsh texture of a glass fiber board, for instance. The quantity of filler employed will depend upon many factors, including the type of final product to be prepared and its end use, the forming equipment to be employed, and the like. The proportions to be added are generally within the range of 0 to 30 parts for each 100 parts of total dry mix. Where the product is to be used for acoustical purposes, about 20% of filler would be a reasonable maximum to employ. Where weight is a problem, the finely ground limestone would not be selected, for it is a heavy, dense material and would appreciably increase the weight of the finished product. Diatomaceous earth is preferred for most uses, especially where the product is to be formed on conventional paper-making equipment suih as a Fourdrinier machine. The product is porous and soft and tends to increase the drainage rate of the stock to facilitate rapid board formation. This is of especial advantage where bentonite is used in the mix.

A sizing material is preferably added to the product to render it resistant to the absorption of moisture. Where glass fibers are employed, it is preferred to use a conventional rosin size, precipitated with alum. Where slag or limestone mineral wools are employed or where a mixture of glass and mineral wool is used, it is preferred to incorporate a wax type size. Other conventional sizing material such as so-called "alkaline sizes" may be used.

In order that the invention may be readily practiced, the following examples are given, illustrating various compositions:

*Examples*

|  | I | II | III | IV | V |
|---|---|---|---|---|---|
| Glass Fiber | 65.00 | 64.00 | 64.00 | 54.00 | 64.00 |
| Virgin Kraft Pulp | 15.00 | 6.00 | 6.00 | 8.00 | 8.00 |
| Flour |  | 10.00 | 10.00 | 8.00 | 8.00 |
| Diatomaceous Earth | 10.00 | 20.00 | 7.00 | 20.00 | 10.00 |
| Bentonite | 10.00 |  | 13.00 | 10.00 | 10.00 |
| Total | 100.00 | 100.00 | 100.00 | 100.00 | 100.00 |
| Rosin Size | .75 | .75 | .75 | .75 | .75 |
| Alum | 1.75 | 1.75 | 1.75 | 1.75 | 1.75 |

|  | VI | VII | VIII |
|---|---|---|---|
| Glass Fiber |  | 32.00 | 16.00 |
| Mineral Wool Fiber | 72.00 | 32.00 | 48.00 |
| Virgin Kraft Pulp | 6.00 | 10.00 | 10.00 |
| Flour | 10.00 | 6.00 | 6.00 |
| Diatomaceous Earth | 12.00 | 20.00 | 20.00 |
| Total | 100.00 | 100.00 | 100.00 |
| Wax Size | .75 | .75 | .75 |
| Alum | 1.50 | 1.50 | 1.50 |

NOTE.—All parts are by weight on a dry solids basis.

The kraft pulp in each of the examples was bleached soft wood kraft pulp which had a permanaganate number of 16 or less and was hydrated to a Canadian 3-gram freeness of 10 or less.

In the examples, the quantity of bentonite varies from 0% to 13% and is between 10% and 13% in the examples which include bentonite.

The physical properties of the foregoing examples are shown in the chart below:

*Physical properties*

| Example No. | Density [1] | Modulus of Rupture [2] | Tensile Strength [2] |
|---|---|---|---|
| I | 22.6 | 316 | 194 |
| II | 23.7 | 416 | 246 |
| III | 20.1 | 283 | 164 |
| IV | 20.4 | 279 | 161 |
| V | 20.7 | 339 | 181 |
| VI | 18.5 | 263 | 180 |
| VII | 20.4 | 258 | 182 |
| VIII | 20.6 | 275 | 155 |

[1] In pounds per cubic foot.
[2] In pounds per square inch.

It will be observed from the table above that very high moduli of rupture and tensile strengths are obtained, even with products of reasonably low density. The product of Example V, for instance, which may be fabricated into a perforated acoustical tile has a density of less than 21 pounds per cubic foot but a modulus of rupture of 339 pounds per square inch.

The material produced in accordance with Example V has been found to meet the requirements of Federal Specification SS-A-118a, dated February 12, 1948, item E-3-a, for an incombustible acoustical material when determined in accordance with test method F-3-c. An official fire test on this material has been conducted by the Riverbank Laboratories of the Armour Research Foundation, Geneva, Illinois.

Where it is not essential to produce an incombustible material, as in some areas where materials which may be classed as fire-retardant may be installed, larger portions of binding ingredients such as the virgin kraft pulp and flour may be used and products of greater structural strength obtained, although for most building material uses to which insulation is put a product with a modulus of rupture above 250 pounds per square inch will be satisfactory, and all of the materials of the examples above are of such class.

In the preparation of material in accordance with the preferred method of this invention, utilizing the composition of Example V as typical, the desired quantity of water, preferably heated to about 100° F., is admitted to a mixing vat, and to this is added the hydrated virgin kraft pulp in slurry form from the Jordan engine. By the addition of the kraft component to the water prior to addition of the glass fibers or other mineral fiber component, the distribution or dispersion of such component in the slurry is facilitated. It is preferred to have the water on the acid side with a pH of 4 to 5, and alum may be added to the water to adjust the pH to such value. Of course, when the white water from the board-forming operation is recirculated from the forming machine to the mixing vat, it will normally have a pH within this range or approaching it.

The glass fiber may be Owens-Corning Fiberglas Corporation's T. W. F. grade of glass wool having an average fiber diameter of .0005" to .0006" and having a preponderance of fibers longer than ½", up to two or more inches in length. The glass fiber should be incorporated into the slurry carefully in order to avoid excessive breaking down of the fibers, but the presence of some fine short fibers in the stock is desirable. After the mineral fiber component has been incorporated into the slurry, the other components may be added, including the bentonite, diatomaceous earth, and flour. Preferred practice is to form a slurry of the bentonite and diatomaceous earth or other filler component. This may be accomplished by stirring these ingredients into cold water, adding the bentonite slowly to obtain good dispersion. A 100-gallon dispersion may be prepared by adding 50 pounds of bentonite and 50 pounds of diatomaceous earth to 95.7 gallons of water at 70° F. The flour slurry may be similarly prepared, a satisfactory proportioning being about 2 pounds of flour to a gallon of slurry. After uniform interspersion has been obtained of these various components with the kraft pulp and mineral fibers, the rosin or wax sizing material and alum precipitant are metered into the mixing chamber. Conventional practice may be followed in the preparation and addition of the sizing ingredients. The final slurry thus formed will have a pH of about 4.7 to 4.8 and may be adjusted by the addition of water to a consistency of about 2.5%. It is then delivered to the machine chest for board formation.

A satisfactory product can be produced using a conventional fiber board forming Fourdrinier machine, but other types of equipment may be employed including a wet mold formation unit such as disclosed in Abbott Patent 2,481,486.

It is important where flour or other starch is used in the binder to maintain the product at a temperature of about 190° F. and under relatively high humidity conditions to first gel the starch. After gelation has been effected, the board may be dried in much the same manner as other fibrous insulation materials. Preferred practice is to avoid heating the product itself to a temperature above about 220° F., for there will be a loss of strength if temperatures above this value are greatly exceeded. It is a recognized fact, of course, that the heating oven will attain a temperature far in excess of this value. The important consideration is to avoid attaining higher temperatures in the board itself.

The term "artificially formed mineral fibers" is used herein to define fibers of glass wool, slag wool, limestone wool, and the like, as well as mixtures thereof and to exclude natural mineral fibers, such as asbestos fibers,

I claim:

1. A self-sustaining mineral fiber product comprising a major portion by weight of artificially formed mineral fibers and a binder therefor comprising virgin kraft pulp having a maximum average permanganate number of 24 and hydrated to a maximum average Canadian 3-gram freeness of 10.

2. A self-sustaining mineral fiber product comprising a major portion by weight of artificially formed mineral fibers and a binder therefor comprising virgin kraft pulp having a maximum average permanganate number of 16 and hydrated to a maximum average Canadian 3-gram freeness of 10.

3. A self-sustaining mineral fiber product in accordance with claim 2 in which the maximum average Canadian 3-gram freeness of the virgin kraft pulp is 5.

4. A self-sustaining mineral fiber product in accordance with claim 1 in which the maximum average Canadian 3-gram freeness of the virgin kraft pulp is essentially zero.

5. A self-sustaining fire-resistant mineral fiber product comprising a major portion by weight of artificially formed mineral fibers and a binder therefor comprising virgin kraft pulp having a maximum average permanganate number of 24 and hydrated to a maximum average Canadian 3-gram freeness of 10 and mineral filler comprising bentonite.

6. A self-sustaining mineral fiber product comprising a major portion by weight of artificially formed mineral fibers, a binder therefor comprising virgin kraft pulp having a maximum average permanganate number of 16 and hydrated to a maximum average Canadian 3-gram freeness of 10, and mineral filler including 10 to 13 pounds of bentonite in a total batch of ingredients having a dry weight of 100 pounds.

7. A self-sustaining mineral fiber product comprising a major portion by weight of artificially formed mineral fibers, 6% to 16% on a total dry solids basis of virgin kraft pulp having a maximum average permanganate number of 16 and hydrated to a maximum average Canadian 3-gram freeness of 10, and 0% to 13% on a total dry solids basis of bentonite.

8. A self-sustaining mineral fiber product comprising a major portion by weight of artificially formed mineral fibers, about 16% by weight on a total dry solids basis of a binder comprising virgin kraft pulp having a maximum average permanganate number of 16 and hydrated to a maximum average Canadian 3-gram freeness of 5, bentonite, and a waterproofing size for the solid components.

9. A self-sustaining fire-resistant mineral fiber product comprising a major portion by weight of artificially formed mineral fibers, a combustible organic binder therefor comprising virgin kraft pulp having a maximum average permanganate number of 24 and hydrated to a maximum average Canadian 3-gram freeness of 10, and as an agent for rendering the surface of the product hard and glazed upon the application of a flame and heating of the mineral fibers to a temperature above their softening point a small but effective amount, up to about 13% on a total dry solids basis, of bentonite.

10. A self-sustaining fire-resistant mineral fiber product comprising a major portion by weight of artificially formed mineral fibers, a combustible organic binder therefor comprising virgin kraft pulp having a maximum average permanganate number of 24 and hydrated to a maximum average Canadian 3-gram freeness of 10 constituting from about 10% to 16% of the total dry weight of the product, diatomaceous earth, and as an agent for rendering the surface of the product hard and glazed upon the application of a flame and heating of the mineral fibers to a temperature above their softening point a small but effective amount, up to about 13% on a total dry solids basis, of bentonite.

11. A self-sustaining fire-resistant mineral fiber product in accordance with claim 9 in which the organic binder also includes an amylaceous material.

12. A self-sustaining fire-resistant mineral fiber product in accordance with claim 9 in which the organic binder also includes wheat flour.

13. In a method of forming a self-sustaining mineral fiber product the steps comprising hydrating a virgin kraft stock having a maximum average permanganate number of 24 to a maximum average Canadian 3-gram freeness of 10, combining said virgin kraft pulp with artificially formed mineral fibers in a slurry, forming the slurry into an article of the desired shape, and drying the same to bond said mineral fibers together by said virgin kraft pulp.

14. In a method of forming a self-sustaining mineral fiber product the steps comprising hydrating a virgin kraft stock having a maximum average permanganate number of 16 to a maximum average Canadian 3-gram freeness of 5, combining said virgin kraft pulp with artificially formed mineral fibers and an amylaceous material in a slurry, forming the slurry into an article of the desired shape, drying the formed article under humid conditions to gel said amylaceous material, and thereafter drying the same to bond said mineral fibers together by said virgin kraft pulp and said converted amylaceous material.

15. In a method of forming a self-sustaining a fire-resistant mineral fiber product containing artificially formed mineral fibers and a combustible organic binder comprising virgin kraft pulp having a maximum average permanganate number of 24 and hydrated to a maximum average Canadian 3-gram freeness of 10, the improvement which comprises adding to a slurry of said artificially formed mineral fibers and said binder a fire-resistant, surface-hardening agent comprising bentonite and removing water from said slurry to deposit said bentonite onto said mineral fibers and binder.

16. In a method of forming a self-sustaining fire-resistant mineral fiber product containing a major portion by weight of artificially formed mineral fibers and about 10% to 16% of a binder on a total dry solids basis, said binder including kraft pulp having a maximum average permanganate number of 24 and hydrated to a maximum average Canadian 3-gram freeness of 10, the improvement which comprises adding to a slurry of said product forming ingredients from about 10% to 13% of bentonite on a total dry solids basis and removing water from said slurry to deposit said bentonite onto said mineral fibers and binder as a fire-resistant, surface-hardening agent.

17. In a method of forming a self-sustaining mineral fiber product, the steps comprising suspending a virgin kraft stock having a maximum average permanganate number of 24 and a maximum average Canadian 3-gram freeness of 10 in water to form a slurry, thereafter combining with said virgin kraft pulp in said slurry artificially formed mineral fibers, forming the slurry into an article of the desired shape, and drying the same to bond said mineral fibers together by said virgin kraft pulp.

18. In a method of forming a self-sustaining mineral fiber product, the steps comprising forming a slurry by suspending a virgin kraft stock having a maximum average permanganate number of 24 and a maximum average Canadian 3-gram freeness of 10 in water having a pH of 4 to 5, combining artificially formed mineral fibers with said virgin kraft pulp in said slurry, forming the slurry into an article of the desired shaped, and drying the same to bond said mineral fibers together by said virgin kraft pulp.

(References on following page)

References Cited in the file of this patent

UNITED STATES PATENTS

| | | |
|---|---|---|
| 1,910,469 | Kitsee | May 23, 1933 |
| 1,972,493 | Powell | Sept. 4, 1934 |
| 2,383,066 | McDermott | Aug. 21, 1945 |
| 2,448,186 | Miller | Aug. 31, 1948 |
| 2,504,744 | Sproull et al. | Apr. 18, 1950 |
| 2,633,433 | Hollenberg | Mar. 31, 1953 |

FOREIGN PATENTS

| | | |
|---|---|---|
| 596,123 | Great Britain | Dec. 29, 1947 |
| 596,124 | Great Britain | Dec. 29, 1947 |

OTHER REFERENCES

TAPPI Monograph No. 4, pp. 172, 173 (1947),
Pulp and Paper by Casey, vol. I, pp. 341–343, pub. by Interscience Publishers, Inc., New York (1952). (Pubs. in Sci. Lib.)